United States Patent [19]

Nebelung et al.

[11] Patent Number: 4,568,371

[45] Date of Patent: Feb. 4, 1986

[54] TAKE-OUT MECHANISM FOR A GLASSWARE FORMING MACHINE

[75] Inventors: Hermann H. Nebelung; Fritz Futterknecht; Rudolf Schwegler, all of Zurich, Switzerland

[73] Assignee: Emhart Industries, Inc., Farmington, Conn.

[21] Appl. No.: 646,719

[22] Filed: Sep. 4, 1984

[30] Foreign Application Priority Data

Sep. 9, 1983 [GB] United Kingdom ............... 8324191

[51] Int. Cl.[4] .................................. C03B 9/44
[52] U.S. Cl. ...................... 65/241; 65/239; 65/260
[58] Field of Search .................... 65/239, 241, 260

[56] References Cited

U.S. PATENT DOCUMENTS 1,783,939 12/1930 Schroder ...................... 65/260 X
4,004,906 1/1977 Rowe ................................ 65/239

Primary Examiner—Arthur Kellogg
Attorney, Agent, or Firm—H. Samuel Kieser

[57] ABSTRACT

The take-out mechanism comprises a tong carrier supporting bottle-gripping tongs. The carrier is mounted on an arm which is turned about a horizontal axis to move the carrier between gripping and release positions. The mechanism also comprises turning means operable to turn the carrier during movement of the arm to maintain the carrier in a constant vertical alignment. The turning means comprises two pulleys one fixedly mounted on the turning axis of the arm and the other rotatable on the arm and carrying the carrier. The pulleys are interconnected by two belts, each fixed to both pulleys and passing around the pulleys in opposite directions.

6 Claims, 5 Drawing Figures

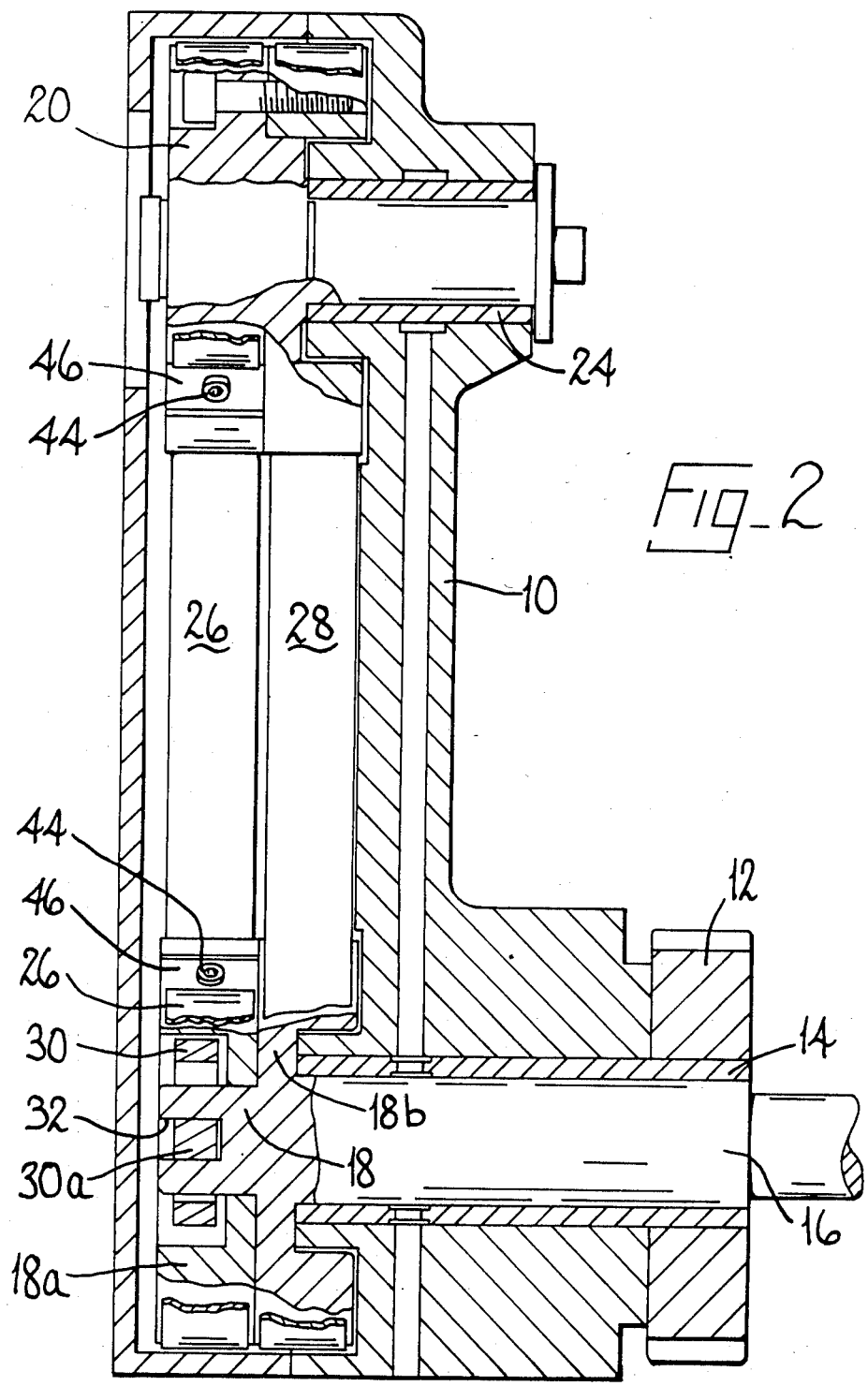
Fig_2

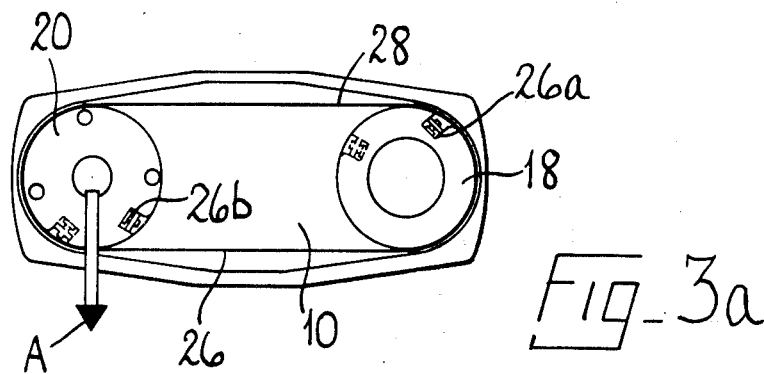
FIG_3a
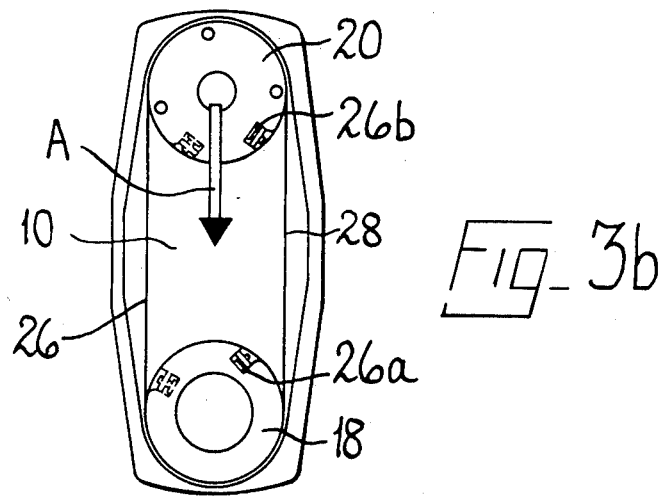
FIG_3b
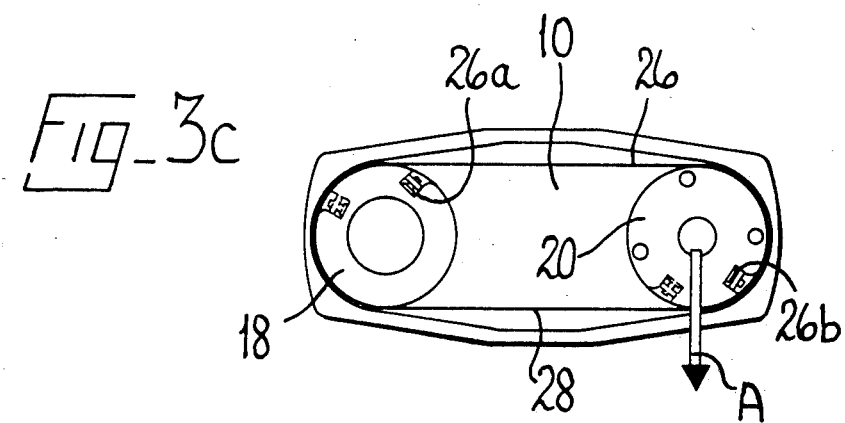
FIG_3c

TAKE-OUT MECHANISM FOR A GLASSWARE FORMING MACHINE

BACKGROUND OF THE INVENTION

This invention is concerned with a take-out mechanism for a glassware forming machine comprising a tong carrier movable in an arcuate path in a vertical plane between a first position at which tongs supported by the carrier can grip an article of glassware and a second position at which the tongs can release the article on to a support, an arm on which the tong carrier is mounted, moving means operable to move the arm arcuately about a first horizontal axis to move the tong carrier along the arcuate path, the tong carrier being supported on the arm for turning movement about a second horizontal axis, and turning means operable to turn the carrier about the second horizontal axis during the arcuate movement so that the carrier remains in a constant vertical alignment.

In glassware forming machines, articles of glassware are blow moulded at a blow moulding station of the machine and then require to be removed from the moulds and positioned on a support, known as a deadplate, before being transferred to a conveyor for removal from the machine. In order to remove the articles of glassware from the moulds and position them on the deadplate, a glassware forming machine has a take-out mechanism which supports tongs or other gripping means which grip an article of glassware in the mould and release it on to the deadplate. Hence, tongs of the take-out mechanism are moved between a first position adjacent the moulds of the glassware forming machine and a second position above the deadplate thereof. The tongs are mounted on an arm which is swung about a horizontal axis through approximately 180° to move the tongs between their first and their second position. Since the articles of glassware are moulded with their bases downwards and require to be stood on their bases on the deadplate, it is necessary for the tongs to remain in the same vertical alignment during the arcuate movement of the arm and, to achieve this, turning means is provided to maintain the tongs in the same vertical alignment during the movement of the arm. In known turning means, a gear is mounted with its central axis aligned with the axis about which the arm swings but the gear is held against turning movement. Known turning means also comprises a gear mounted for turning movement about a second horizontal axis on the arm, the tongs being carried by the gear, and interconnecting means inconnecting the two gears and operable to cause the second gear to turn as the arm swings. In one form of interconnecting means, a chain passes around both the gears and in another form an idler gear mounted on the arm meshes with both of the aforementioned gears. With both these interconnecting means, vibration is caused by backlash, in the first case between the chain and the gears and in the second case between the various gears, which causes vibration of the glassware as it is carried by the tongs with possible damage to the glassware. In the case of the chain, problems also arise due to stretching of the chain which has led to the use of a tensioning device bearing on the chain between the gears so that the weight and complexity of the arm is increased. In the case of the idler gear construction, the weight and complexity of the arm is also increased by the presence of the idler gear and the bearings therefor.

It is an object of the present invention to provide a take-out mechanism for a glassware forming machine which has turning means which avoids the aforementioned backlash problem and enables the use of a less heavy and complex arm.

BRIEF SUMMARY OF THE INVENTION

The invention provides a take-out mechanism for a glassware forming machine comprising a tong carrier movable in an arcuate path in a vertical plane between a first position at which tongs supported by the carrier can grip an article of glassware and a second position at which the tongs can release the article on to a support, an arm on which the tong carrier is mounted, moving means operable to move the arm arcuately about a first horizontal axis to move the tong carrier along the arcuate path, the tong carrier being supported on the arm for turning movement about a second horizontal axis, and turning means operable to turn the carrier about the second horizontal axis during the arcuate movement so that the carrier remains in a constant vertical alignment, wherein the turning means comprises two cylindrical pulleys of substantially the same diameter, a first of the pulleys being fixedly mounted so that it cannot turn with a central axis thereof aligned with the first horizontal axis and a second of the pulleys being mounted on the arm for turning movement about the second horizontal axis, the tong carrier being mounted on the second pulley, and two belts interconnecting the pulleys, each of the belts having an end portion secured to the first pulley and an opposite end portion secured to the second pulley, the first belt passing clockwise around a portion of the circumference of the first pulley from its point of attachment thereto, extending between the pulleys tangentially to both pulleys, and passing clockwise around a portion of the circumference of the second pulley to its point of attachment thereto, and the second belt passing anti-clockwise around a portion of the circumference of the first pulley from its point of attachment thereto, extending between the pulleys tangentially to both pulleys, and passing anti-clockwise around a portion of the circumference of the second pulley to its point of attachment thereto, the two belts having substantially equal tensions.

In order to assist in setting up the take-out mechanism with the belts having a substantially equal tensions, the first pulley may comprise two abutting cylindrical portions, to one of which the first belt is secured and to the other of which the second belt is secured, one of the portions being rigidly fixed against turning movement and the other of the portions being turnable about the first horizontal axis to tension the belts, and the mechanism also comprises clamping means operable to clamp the portions of the first pulley together against relative turning movement. Alternatively, instead of clamping means, the mechanism may also comprise a spring which acts between a fixed point and the turnable portion, the spring serving to tension the belts and to prevent turning of the turnable portion during operation of the mechanism.

Conveniently, the belts may be made of steel having a thickness of 0.2 mm to 0.5 mm (0.008 to 0.02 inches).

For ease of attachment of the belts to the pulleys, the end portions of the belts may be received in recesses in the cylindrical pulleys and be clamped therein, the end portions being pre-shaped to conform to the shape of the recesses.

Conveniently, each belt engages between 320° and 300° of the circumference of one pulley when the tong carrier is in its first position and between 140° and 120° of the circumference of that pulley when the tong carrier is in its second position.

BRIEF DESCRIPTION OF DRAWINGS

There now follows a detailed description, to be read with reference to the accompanying drawings, of a takeout mechanism which is illustrative of the invention. It is to be understood that the illustrative take-out mechanism has been selected for description by way of example and not of limitation of the invention.

In the drawings:

FIG. 2 is a side elevational view, with parts broken away to show the construction, of the turning means shown in FIG. 1; and FIGS. 3A, 3B and 3C are diagrammatic views of the turning means of the illustrative take-out mechanism, on a smaller scale than FIGS. 1 and 2, showing successive stages of the operation thereof.

DETAILED DESCRIPTION OF PREFERRED EMBODIMENT OF THE INVENTION

Figure 1:
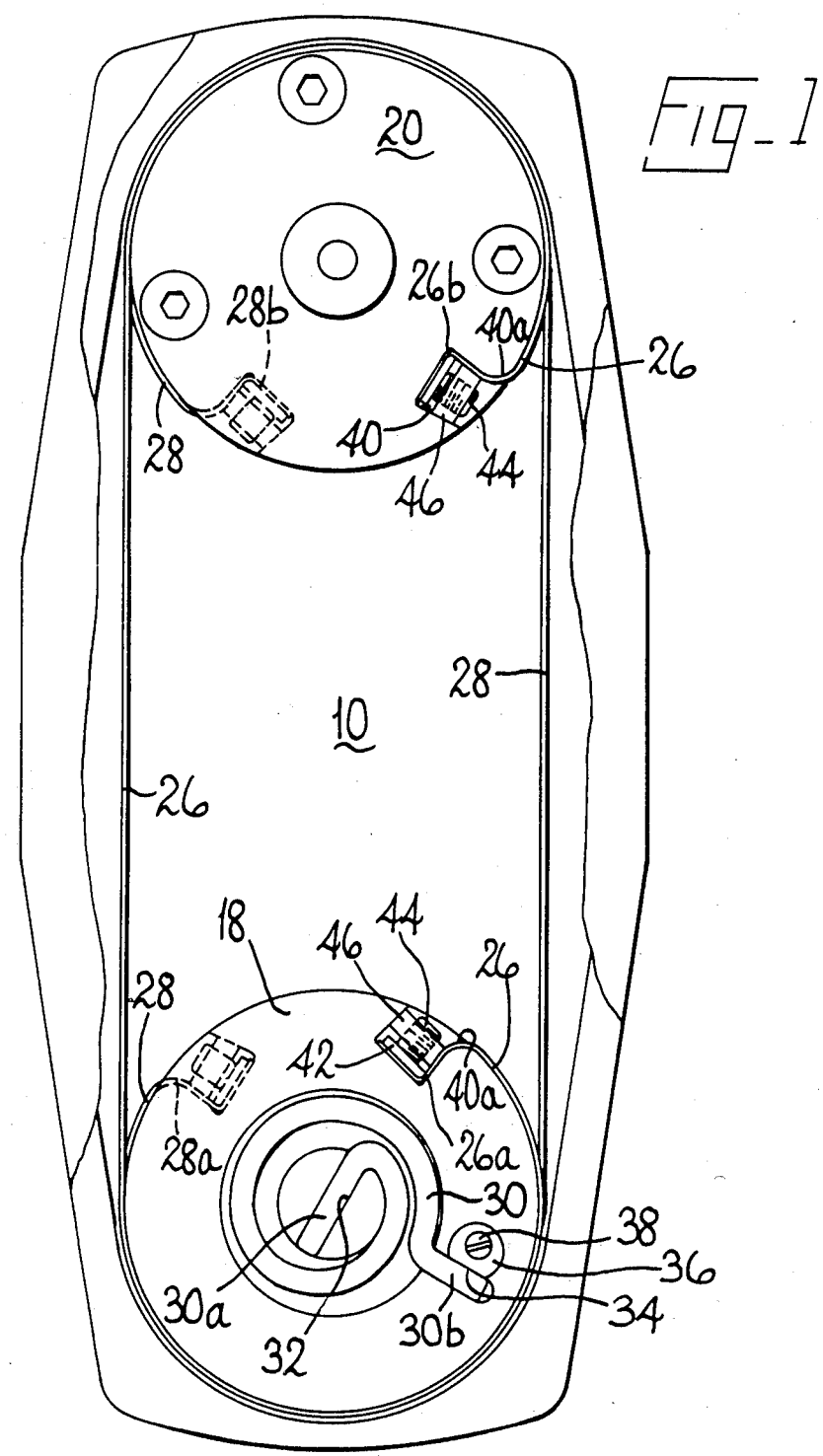
FIG. 1 is a front elevational view of the turning means of the illustrative take-out mechanism, showing it in an intermediate position thereof in which the arm of the take-out mechanism is substantially vertical.

The illustrative take-out mechanism is for a glassware forming machine of the individual section type. The mechanism comprises a tong carrier (not shown) movable in an arcuate path in a vertical plane between a first position (adjacent moulds of the machine) at which tongs (not shown) supported by the carrier can grip an article of glassware in the mould and a second position (above a deadplate of the machine) at which the tongs can release the article on to a support in the form of the deadplate. The tong carrier and tongs are of conventional construction and well known in individual section machines. The illustrative take-out mechanism also comprises an arm 10 on which the tong carrier is mounted and moving means operable to move the arm 10 arcuately about a first horizontal axis to move the tong carrier along the arcuate path. The tong carrier is supported on the arm (as will be described)for turning movement about a second horizontal axis. The moving means is of conventional construction and comprises a gear 12 attached to the arm 10 and turnable about the first horizontal axis by means of a rack (not shown) meshed with the gear 12 which is moved by a piston and cylinder assembly (not shown) in conventional manner. The arm 10 and the gear 12 are mounted for turning movement on a bearing 14 which surrounds a fixed shaft 16 which extends along the aforementioned first horizontal axis.

The turning means of the illustrative take-out mechanism is operable to turn the tong carrier about the second horizontal axis during the arcuate movement of the arm so that the carrier remains in a constant vertical alignment. The turning means comprises two cylindrical pulleys of substantially the same diameter. A first of the pulleys 18 is fixedly mounted on the shaft 16 so that it cannot turn with its central axis aligned with the first horizontal axis. A second 20 of the pulleys is mounted on the arm 10 for turning movement about the second horizontal axis. The tong carrier is attached to the pulley 20 for turning movement therewith and incorporates a shaft which extends into a hollow cylindrical recess in the arm 10 in which it can turn on bearings 24.

The turning means of the illustrative take-out mechanism also comprises two steel belts which interconnect the pulleys 18 and 20. The belts are made of flexible but strong steel of a thickness between 0.2 mm and 0.5 mm and may for example be made of Sandvik 7C27Mo2. These belts form interconnecting means operable to cause the pulley 20 to turn as the arm 10 turns about the shaft 16 so that the tong carrier is retained in a vertical alignment. The belts are displaced from one another transversely of the pulleys so that they do not foul one another.

A first 26 of the belts interconnecting the pulleys has an end portion 26a secured to the first pulley 18 and an opposite end portion 26b secured to the second pulley 20. The first belt 26 passes clockwise around a portion of the circumference of the first pulley 18 from its point of attachment thereto, extends between the pulleys 18 and 20 tangentially to both pulleys, and passes clockwise around a portion of the circumference of the second pulley 20 to its point of attachment thereto (see FIG. 1). A second 28 of the belts has an end portion 28a secured to the first pulley 18 and an opposite end portion 28b secured to the second pulley 20. The second belt 28 passes anti-clockwise around a portion of the circumference of the first pulley 18 from its point of attachment thereto, extends between the pulleys 18 and 20 tangentially to both pulleys, and passes anti-clockwise around a portion of the circumference of the second pulley 20 to its point of attachment thereto. Both the belts 26 and 28 are arranged to have substantially equal tension.

FIGS. 3A, 3B and 3C illustrate successive stages in the operation of the turning means of the illustrative take-out mechanism. FIG. 3A shows the mechanism at the first position thereof in which the arm 10 is substantially horizontal. The arrow A represents the vertical alignment of the tong carrier (not shown) attached to the pulley 20. FIG. 3B shows an intermediate position in which the arm 10 extends substantially vertically upwardly (this view is equivalent to FIG. 1) and FIG. 3C shows the position of the arm 10 when the tong carrier is at its second position in which the arm 10 extends substantially horizontally but in the opposite direction to the position shown in FIG. 3A. In FIG. 3A the belt 26 can be seen to extend clockwise around the pulley 18 from the point of attachment of the end portion 26a to the pulley 18 for approximately 140° of the circumference of the pulley 18. The belt 26 then loses contact with the pulley 18 and extends tangentially of both pulleys 18 and 20 between the pulleys 18 and 20. After coming into engagement with the circumference of the pulley 20, the belt 26 extends around the pulley 20 for approximately 310° until it reaches the point of attachment of its end portion 26b to the pulley 20. In moving from the position shown in FIG. 3A to that shown in FIG. 3B, the belt 26 is wrapped on to the pulley 18 which remains stationary but is unwrapped from the pulley 20 which turns through 90° to maintain the arrow A in the same direction. Thus, in FIG. 3B the belt 26 extends around approximately 230° of the circumference of the pulley 18 and 220° of the circumference of the pulley 20. In moving from the position shown in FIG. 3B to the position shown in FIG. 3C, the belt 26 continues to wrap around the pulley 18 and continues to unwrap from the pulley 20. Thus, in the position shown in FIG. 3C, the belt 26 extends around approximately 320° of the circumference of the pulley 18 and 130° of the circumference of the pulley 20. During the movement from the position shown in FIG. 3A to the position shown in FIG. 3C, the belt 26 causes the pulley 20 to turn about the second horizontal axis so that the arrow A remains in its vertical alignment. Also during this movement, the belt 28 serves to maintain the belt 26 in tension. During the movement, the belt 28 is unwrapped from the pulley 18 but is wrapped on to the pulley 20. During the return movement of the illustrative take-out mechanism, in which the mechanism moves from the position shown in FIG. 3C to the position shown in FIG. 3A passing through the position shown in FIG. 3B, the roles of the two belts 26 and 28 are reversed so that the belt 28 causes the movement of the pulley 20 while the belt 26 serves to maintain the tension.

The construction of the first pulley 18 will now be described in more detail. The first pulley 18 comprises two abutting cylindrical portions, to one 18a of which the first belt 26 is secured and to the other 18b of which the second belt 28 is secured. The portion 18b is integral with the shaft 16 and is therefore rigidly fixed against turning movement and the other portion 18a is turnable about the first horizontal axis during setting up of the illustrative take-out mechanism the illustrative mechanism also comprises a coil spring 30 (see FIGS. 1 and 2) made of thick metal rod having one end 30a received in a slot 32 in the shaft 16 so that the end 30a is attached to a fixed point and the other end 30b of the spring 30 is received in a slot 34 in the portion 18a and is secured therein by a wedge 36 held by a screw 38 which enters the portion 18a. The spring 30 acts between the fixed point provided by the slot 32 and the turnable portion 18a of the pulley 18 and serves to tension the belts 26 and 28 and to prevent turning of the turnable portion 18a during operation of the mechanism. When setting up the illustrative mechanism, the belt 28 is attached to both the pulleys 18 and 20 and the belt 26 is attached to the pulley 20. Then, the turnable portion 18a of the pulley 18 is turned against the action of the spring 30 by means of a special tool so that the belt 26 can be attached to the pulley 18. Upon release of the portion 18a of the pulley 18 by the special tool, the spring 30 determines the tension in both belts 26 and 28 and prevents the turnable portion 18a from turning in the operation of the illustrative mechanism. As an alternative to the use of the spring 30, in an alternative embodiment of the invention, clamping means in the form of clamping screws are provided to clamp the portions 18a and 18b of the pulley 18 together against relative turning movement so that after the belts have been attached to both the pulleys, the turnable portion 18a can be turned to give the correct tension to both belts 26 and 28 and the two portions of the pulley 18a and 18b are then clamped together. For ease of assembly, the pulley 20 is also constructed in two abutting portions which are bolted together.

The way in which the end portions 26a, 26b, 28a, and 28b of the belts 26 and 28 are secured to the pulleys 18 and 20 will now be described in more detail. At the point of attachment of an end portion 26a, 26b, 28a, or 28b of a belt, a recess 40 is formed in the cylindrical surface of the pulley 18 or 20 (see FIG. 1) the recess 40 increases in width towards the bottom thereof and has a curved lip 40a over which the belt 26 or 28 passes to enter the recess 40. The end portion of the belt 26 or 28 is pre-shaped to pass over the lip 40a down the side of the recess 40 and across a flat bottom portion thereof. A plate 42 overlies the portion of the belt which extends across the bottom of the recess 40 and is held in clamping engagement with the belt 26 or 28 by two threaded studs 44 each of which has a lower narrower threaded portion (not shown) which passes through a hole in the plate 42 and the belt 26 or 28 and is received in a threaded recess in the pulley 18 or 20, and an upper threaded portion of larger diameter which engages the plate 42 and holds it in clamping engagement with the belt 26 or 28 and is also screw threaded. A wedge member 46 is threadedly received by both the studs 44 and serves to clamp the belt against the edge of the recess 40.

With the turning means of the illustrative take-out mechanism problems associated with backlash between gears and/or chains are avoided and the arm 10 can be constructed more simply since there is no need to provide for bearings for an idler gear or a mounting for a tensioning device for a chain. It is found that good results are achieved if each belt 26 and 28 engages between 320° and 300° of the circumference of one pulley 18 or 20 when the tong carrier is in its first position and between 140° and 120° of the circumference of that pulley when the tong carrier is in its second position.

We claim:

1. A take-out mechanism for a glassware forming machine comprising a tong carrier movable in an arcuate path in a vertical plane between a first position at which tongs supported by the carrier can grip an article of glassware and a second position at which the tongs can release the article on to a support, an arm on which the tong carrier is mounted, moving means operable to move the arm arcuately about a first horizontal axis to move the tong carrier along the arcuate path, the tong carrier being supported on the arm for turning movement about a second horizontal axis, and turning means operable to turn the carrier about the second horizontal axis during the arcuate movement so that the carrier remains in a constant vertical alignment, wherein the turning means comprises two cylindrical pulleys of substantially the same diameter, the first of the pulleys being fixedly mounted so that it cannot turn with a central axis thereof aligned with the first horizontal axis and a second of the pulleys being mounted on the arm for turning movement about the second horizontal axis, the tong carrier being mounted on the second pulley, and two belts interconnecting the pulleys, each of the belts having an end portion secured to the first pulley and an opposite end portion secured to the second pulley, the first belt passing clockwise around a portion of the circumference of the first pulley from its point of attachment thereto, extending between the pulleys tangentially to both pulleys, and passing clockwise around a portion of the circumference of the second pulley to its point of attachment thereto, and the second belt passing anti-clockwise around a portion of the circumference of the first pulley from its point of attachment thereto, extending between the pulleys tangentially to both pulleys, and passing anti-clockwise around a portion of the circumference of the second pulley to its point of attachment thereto, the two belts being in side-by-side relationship on the circumference of each of the pulleys and each belt engaging a sufficient portion of the circumference of each pulley to permit the desired arcuate movement of said arm, the two belts having substantially equal tensions.

2. A take-out mechanism according to claim 1, wherein the first pulley comprises two abutting cylindrical portions, to one of which the first belt is secured and to the other of which the second belt is secured, one of the portions being rigidly fixed against turning movement and the other of the portions being turnable about the first horizontal axis to tension the belts and the mechanism also comprises clamping means operable to clamp the portions of the first pulley together against relative turning movement.

3. A take-out mechanism according to claim 1, wherein the first pulley comprises two abutting cylindrical portions, to one of which the first belt is secured and to the other of which the second belt is secured, one of the portions being rigidly fixed against turning movement and the other of the portions being turnable about the first horizontal axis, and the mechanism also comprises a spring which acts between a fixed point and the turnable portion, the spring serving to tension the belts and to prevent turning of the turnable portion during operation of the mechanism.

4. A take-out mechanism according to any one of claims 1 to 3, wherein the belts are made of steel having a thickness of 0.2 mm to 0.5 mm (0.008 to 0.02 inches).

5. A take-out mechanism according to any one of claims 1 to 3, wherein the end portions of the belts are received in recesses in the cylindrical pulleys and are clamped therein, the end portions being pre-shaped to conform to the shape of the recesses.

6. A take-out mechanism according to any one of claims 1 to 3, wherein each belt engages between 320° and 300° of the circumference of one pulley, when the tong carrier is in its first position, and between 140° and 120° of the circumference of that pulley when the tong carrier is in its second position.

* * * * *